(12) United States Patent
Tabachnik

(10) Patent No.: US 6,330,427 B1
(45) Date of Patent: Dec. 11, 2001

(54) TALKING NOVELTY DEVICE WITH BOOK

(76) Inventor: Joel B. Tabachnik, 3298 NW. 62nd La., Boca Raton, FL (US) 33496-3395

( * ) Notice: Subject to any disclaimer, the term of this patent is extended or adjusted under 35 U.S.C. 154(b) by 0 days.

(21) Appl. No.: 09/391,780

(22) Filed: Sep. 8, 1999

(51) Int. Cl.$^7$ ................................................. G09B 5/00
(52) U.S. Cl. ........................................ 434/317; 434/308
(58) Field of Search ................................. 434/116, 308, 434/309, 317; 446/77, 81, 297, 397; 178/18.01, 18.05

(56) References Cited

U.S. PATENT DOCUMENTS

| | | | |
|---|---|---|---|
| 2,822,425 | * 2/1958 | Hicks | 434/317 |
| 3,401,470 | * 9/1968 | Gaven | 434/308 |
| 3,522,665 | 8/1970 | Kalt | 35/9 |
| 4,457,719 | 7/1984 | Dittakavi et al. | 434/159 |
| 4,466,801 | 8/1984 | Dittakavi et al. | 434/335 |
| 4,505,682 | 3/1985 | Thompson | 434/335 |
| 4,549,867 | 10/1985 | Dittakavi | 434/337 |
| 4,602,152 | 7/1986 | Dittakavi | 235/463 |
| 4,778,391 | * 10/1988 | Weiner | 434/317 |
| 4,793,812 | * 12/1988 | Sussman et al. | 434/116 |
| 4,809,246 | 2/1989 | Jeng . | |
| 4,884,974 | * 12/1989 | Desmet | 434/317 |
| 4,990,092 | 2/1991 | Cummings . | |
| 5,059,126 | * 10/1991 | Kimball | 434/308 |
| 5,059,149 | 10/1991 | Stone . | |
| 5,226,822 | 7/1993 | Morris . | |
| 5,356,296 | 10/1994 | Pierce et al. . | |
| 5,374,195 | 12/1994 | McClanahan . | |
| 5,392,390 | 2/1995 | Crozier | 395/161 |
| 5,407,357 | 4/1995 | Cutler . | |
| 5,413,486 | 5/1995 | Burrows et al. . | |
| 5,417,575 | 5/1995 | McTaggart . | |
| 5,419,705 | 5/1995 | Sandvik . | |
| 5,437,552 | 8/1995 | Baer et al. . | |
| 5,453,013 | 9/1995 | Billings et al. . | |
| 5,466,158 | 11/1995 | Smith, III . | |
| 5,484,292 | 1/1996 | McTaggart . | |
| 5,501,601 | 3/1996 | Todokoro et al. | 434/169 |
| 5,531,600 | 7/1996 | Baer et al. . | |
| 5,538,430 | 7/1996 | Smith et al. . | |
| 5,559,672 | 9/1996 | Buras, Jr. et al. | 361/684 |
| 5,567,163 | 10/1996 | Ku . | |
| 5,569,868 | 10/1996 | Leung . | |
| 5,575,659 | * 11/1996 | King et al. | 434/309 |
| 5,598,539 | 1/1997 | Gephardt et al. | 395/281 |
| 5,609,488 | 3/1997 | McTaggart . | |
| 5,631,883 | 5/1997 | Li . | |
| 5,644,471 | 7/1997 | Schultz et al. | 645/980 |
| 5,645,432 | 7/1997 | Jessop . | |
| 5,674,076 | 10/1997 | Billings et al. | 434/365 |
| 5,686,705 | 11/1997 | Conroy et al. . | |
| 5,727,202 | 3/1998 | Kucala | 395/610 |
| 5,749,764 | 5/1998 | Bailey . | |
| 5,788,554 | 8/1998 | Goodwin et al. | 446/100 |
| 5,795,213 | 8/1998 | Goodwin . | |
| 5,803,748 | 9/1998 | Maddrell et al. . | |
| 5,810,604 | 9/1998 | Kopp, Jr. et al. . | |

(List continued on next page.)

OTHER PUBLICATIONS

Phonics Fun, Hot Dots Activity Set, Educational Insights, Inc., 1997.

*Primary Examiner*—Sam Rimell
(74) *Attorney, Agent, or Firm*—Brinks Hofer Gilson & Lione

(57) ABSTRACT

A novelty device assembly is provided. The novelty device includes an audio signal generator and a book. The audio signal generator is capable of being removably secured to the novelty device. The audio signal generator includes a memory to store data and a speaker to provide an audible signal. The book is separate from the audio signal generator and includes a plurality of pages having discrete printed information. Each page contains a contact capable of being detected by the audio signal generator. The pointer retrieves data from the memory corresponding to the selected page and converts it into an audible signal.

24 Claims, 3 Drawing Sheets

U.S. PATENT DOCUMENTS

| | | |
|---|---|---|
| 5,877,458 | 3/1999 | Flowers . |
| 5,897,324 | 4/1999 | Tan .................................... 434/317 |
| 5,899,700 * | 5/1999 | Williams et al. .................. 434/308 |
| 5,944,533 | 8/1999 | Wood ................................. 434/322 |
| 5,945,656 * | 8/1999 | Lemelson et al. ................. 434/308 |
| 5,954,515 | 9/1999 | Iggulden ............................ 434/317 |
| 5,960,411 | 9/1999 | Hartman et al. ................... 705/26 |
| 5,991,693 | 11/1999 | Zalewski ............................ 701/300 |
| 6,011,949 | 1/2000 | Shimomukai ...................... 434/358 |
| 6,041,215 | 3/2000 | Maddrell et al. ................... 434/317 |

* cited by examiner

TALKING NOVELTY DEVICE WITH BOOK

FIELD OF THE INVENTION

The present invention relates to the field of talking novelty devices or toys. More specifically, the present invention relates to a toy with a talking pointer and book.

BACKGROUND OF THE INVENTION

Talking books are known, and are a popular item for children, especially young children who are learning or have just learned to read. Typically, a talking book has an integral sound source for producing sounds when actuated by the reader. Such sound sources may be mechanical, such as a bellows actuated reed or whistle, or may be electronic, in which sounds are stored digitally and reproduced electronically. The sound source, whatever its structure, is usually keyed to the story in the book so that the sounds produced bear some relationship to the content of the story. This sound source is not only keyed to the story, it has been previously incorporated into the book so as to become a permanent part of the book. While these books are enjoyable and educational for the child, they are limited in that they are unable to provide a more active role for the child to play when reading the book or having the book read to him or her.

A child's interest and imagination are enhanced when the child is able to take a more active role in reading or listening to a book. To provide a more enjoyable and more educational reading experience, it is desired to provide a novelty item or toy such as a stuffed bear or doll, a book, and a sound source that can be separated, on occasion, from the novelty item or toy. The sound source preferably produces realistic sounds, such as sounds of human speech. This gives a reading novelty item a greater play value and greater educational value. By permitting the sound source to be removed from the novelty item, the reader, particularly a young child, can more actively and more realistically act out the story along with the characters in the book. This gives the child a greater feeling of participation in the reading process, and stimulates the child's interest in reading.

Prior attempts to provide this type of experience to a child reader have been made but have fallen short. Therefore, there is a need for an improved novelty item which provides the required activity for a user. This novelty item must be capable of easily being used in a number of ways while being capable of being constructed in a cost-efficient manner.

BRIEF SUMMARY OF THE INVENTION

The present invention relates to novelty device that gives a user, such as a child, a greater feeling of participation in the reading process, and stimulates the child's interest in reading A novelty device assembly for audibly providing the text of a written work is provided. The novelty device includes an audio signal generator and a book. The audio signal generator is capable of being removably secured to the novelty device. The audio signal generator includes a memory to store data and a speaker to provide an audible signal. The book is separate from the audio signal generator and includes a plurality of pages having discrete printed information. Each page contains a contact capable of being detected by the audio signal generator. The pointer retrieves data from the memory corresponding to the selected page and converts it into an audible signal.

According to another aspect of the invention, a novelty device assembly for audibly providing the text of a written work is provided. The assembly includes a pointer capable of being removably secured to the novelty device. The pointer further includes an audio signal generator having a memory to store data and a speaker to provide an audible signal. The book is separate from the pointer. The book includes a plurality of pages having discrete printed information. Each page contains a contact capable of being detected by the audio signal generator. The audio signal generator retrieves data from the memory corresponding to the selected page and converts the data into an audible signal.

According to yet another aspect of the invention, a novelty device assembly for audibly providing the text of a written work is provided. The assembly includes a novelty device, a pointer and a book. The pointer is capable of being removably secured to the novelty device and includes an audio signal generator having a memory to store data and a speaker to provide an audible signal. The book is separate from the audio signal generator. The book includes a plurality of pages having different printed information with each page containing a different contact capable of being detected by the pointer. The pointer is capable of retrieving data from the memory corresponding to the selected page and converting the data into an audible signal.

The present invention together with attendant objects and advantages, will be best understood with reference to the detailed description below in connection with attached drawings.

DETAILED DESCRIPTION OF THE INVENTION

Figure 1:
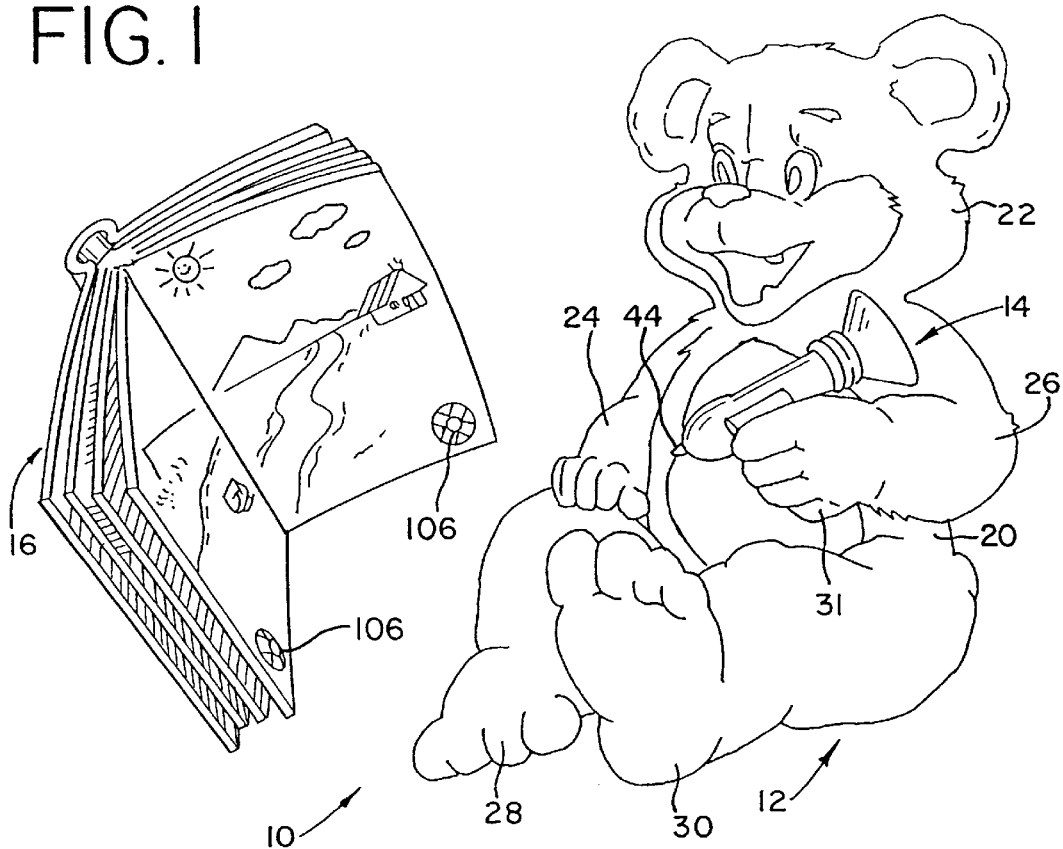
FIG. 1 is a perspective view of a first embodiment of the novelty assembly of the present invention.
Figure 4:
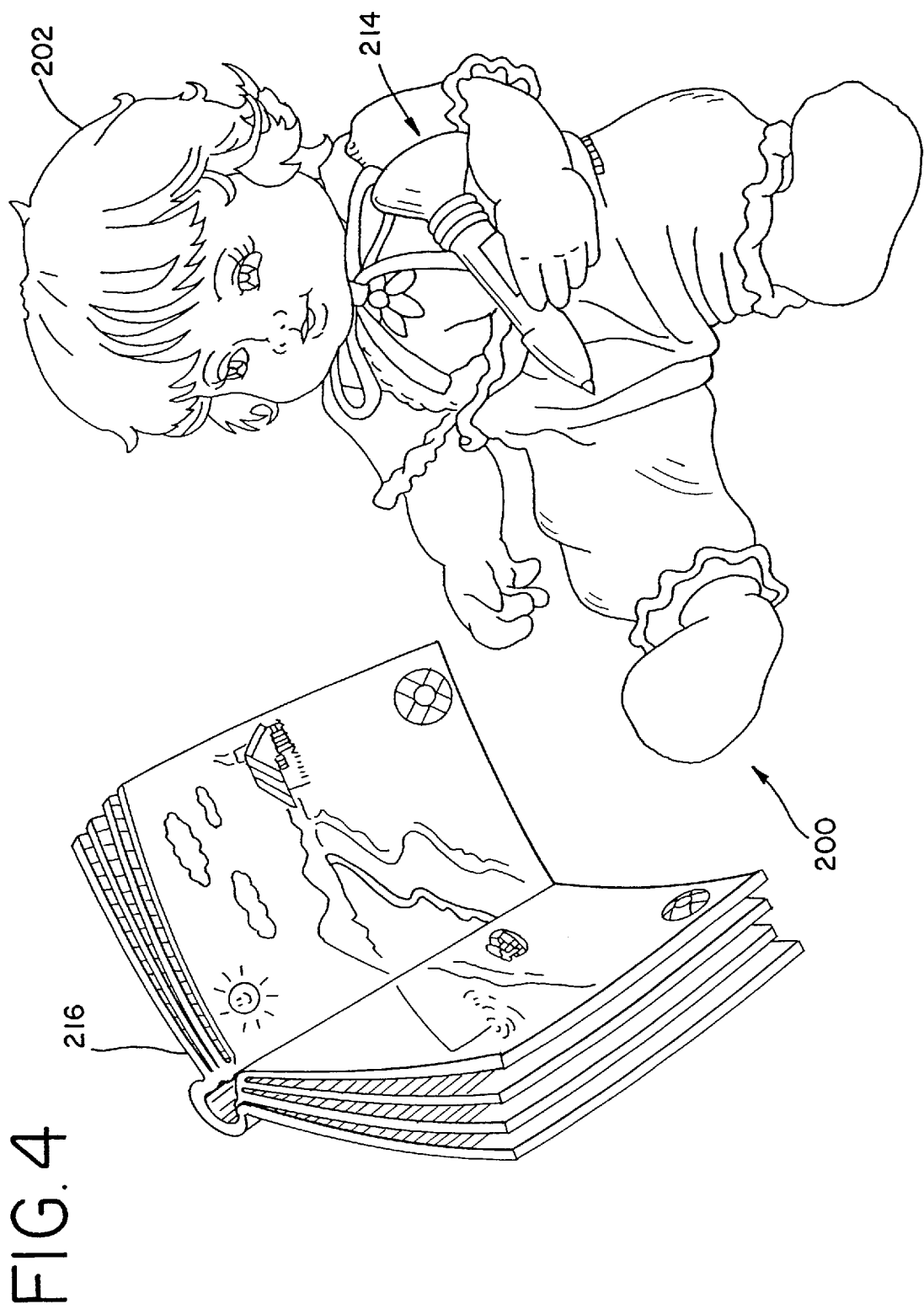
FIG. 4 is a perspective view of a novelty assembly illustrating another preferred embodiment of the present invention.

FIG. 1 is a perspective view of novelty assembly 10 incorporating a first preferred embodiment of the present invention. The novelty assembly 10 includes a stuffed animal such as the bear 12, a pointer 14 and the book 16. While a bear 12 is illustrated in FIG. 1, other novelty devices or toys such as a doll as illustrated in FIG. 4 or other animal characters such as a turtle may also be used with the present invention. The present invention may also be used with various licensed characters. The bear 12 includes a body or torso 20, a head 22, two arms (right and left) 24, 26 and two legs 28, 30. In the present embodiment, the left arm 26 of the bear 12 holds the pointer 14. The pointer 14 is sized so as to be secured within the paw 31 of the bear. Alternatively, the pointer 14 could be secured to the paw 31 using velcro or other suitable securing methods.

Figure 2:
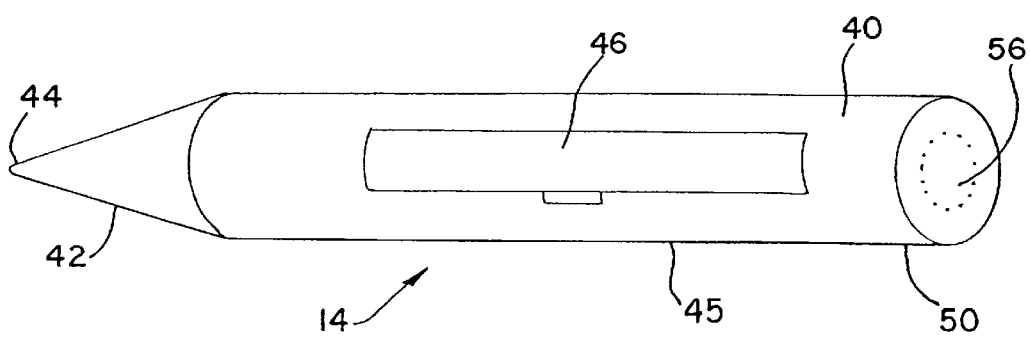
FIG. 2 is a perspective view of a pointer as illustrated in FIG. 1.

Referring to FIG. 2, an enlarged view of the pointer 14 is illustrated. The pointer 14 includes an outer surface 40. On the end 42, a contact point 44 is located. A middle portion 45 of the pointer 14 includes a door 46 covering a compartment for a power supply such as a three volt battery. The other end 50 includes a speaker 56 capable of generating an audible signal.

Figure 3:
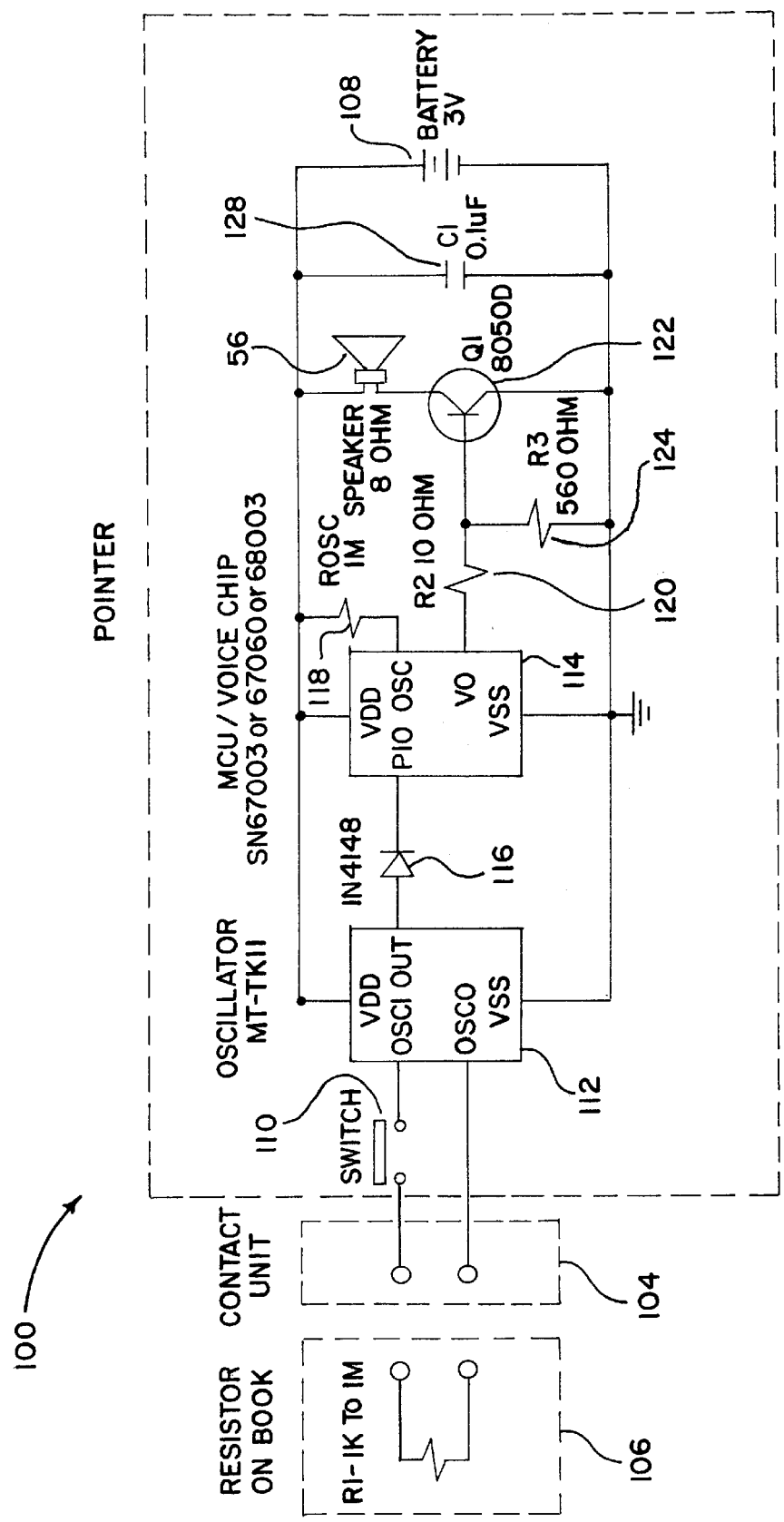
FIG. 3 is a circuit diagram illustrating the pointer and a contact on the book.

Referring to FIG. 3, a circuit diagram 100 for a preferred embodiment, of the audible signal generator portion of the pointer 14 is illustrated. The circuit 100, the book resistor 106, and contact unit 104 control the audible signal generated from the pointer 14. The contact point 44 of the pointer 14 has a contact unit 104. The contact unit 104 is for use with a contact or book resistor 106 on the book 16. Preferably, the pointer 14 includes a power source 108, e.g., a three volt battery, and a switch 110 which can be opened when the pointer 14 is not in use to prevent an unnecessary drain of the power source 108. The circuit 100 is a normally opened circuit which becomes closed when switch 110 is closed and the contact unit 104 of the pointer 14 touches the book resistor 106 of the book 16.

To obtain a specific message corresponding to a certain page of the book 16, an impedance of book resistor 106 varies, for example, from one thousand to one million ohms. When the contact point 44 of the pointer 14 touches the book resistor 106 it electrically connects to an oscillator 112 to cause the oscillator 112 to produce an output waveform at a certain frequency depending on a value of the book resistor 106. An exemplary oscillator is Model number MT-TK11 manufactured by HHC located in Taiwan.

Thereafter, the output waveform of the oscillator 112 is fed via a diode 116 to an input port of a voice chip 114. An exemplary diode is Model number IN4148 manufactured by Phillips located in Hong Kong, and exemplary voice chips are micro controller unit (MCU) Model numbers SN67003, SN67060, and SN68063 manufactured by Sonix located in Taiwan. The voice chip 114 counts the number of pulses of the input waveform that occur within a predetermined time period, e.g., three milliseconds. To accommodate the counting of pulse signals, the voice chip 114 includes an oscillator which is powered by the power source 108 via a first resistor 118. Thereafter, to determine the specified message, the voice chip 114 compares the counted number of pulses to, for example, an internal lookup table. The lookup table includes information corresponding to the printed subject matter found in the book 16. According to the lookup table, a sound output corresponding to the specified message is read out of a read only memory (ROM) of the voice chip, for example.

The sound output passes through an amplifier circuit which includes a second resistor 120 connected from the sound output of the voice chip 114 to a base of a transistor 122, and a third resistor 124 connected from the base of the transistor 122 to ground. An exemplary transistor is Model number 8050 manufactured by Samsung located in South Korea; however, equivalent transistors can be used. A collector of the transistor 122 connects to a speaker 56 which connects to a capacitor 128 and the power source 108 in shunt. Those of ordinary skill in the art will appreciate that resistance and capacitance values shown in FIG. 3 are for exemplary purposes only, and that other values may be used to operate the circuit 100.

FIG. 4 illustrates another preferred embodiment of the novelty assembly 200 of the present invention. The novelty assembly 200 operates in essentially the same way as does the embodiment 10 of FIG. 1, with the exception that the doll 202 is used in place of the bear 12. The pointer 214 and the book 216 are constructed as described above.

With reference to FIG. 1, in use, an adult or a child could depress the bear's paw 30 and the pointer 14 against the book resistor 106. The pointer 14 will detect the value of the resistor 106 and generate an audible signal that corresponds with the discrete printed subject matter on the selected page of the book 16. A user could then depress the bear's paw 31 and the pointer 14 against the bood resistor 106 found on another page of the book 16. As a result, a second audible signal is generated that corresponds with the text of the next selected page. Alternatively, the user could remove the pointer 14 from the bear's paw 31 and using their hand depress it against the bood resistor 106 on another page thereby generating an audible signal that corresponds with the printed subject matter of the selected page.

The embodiments described above and shown herein are illustrative and not restrictive. The scope of the invention is indicated by the claims rather than by the foregoing description and attached drawings. The invention may be embodied in other specific forms without departing from the spirit of the invention. For example, the novelty device can include bears, dolls and other figures as recognized by those of ordinary skill in the art. Also, the specific circuitry used to generate an audible signal could include a wide variety of known constructions without departing from the claimed invention. Accordingly, these and any other changes which come within the scope of the claims are intended to be embraced herein.

I claim:

1. A novelty device assembly comprising:
    (a) a novelty character;
    (b) an audio signal generator capable of being supported by the novelty character and including a memory to store data and a speaker to provide an audible signal, the audio signal generator having a housing in which the memory and speaker are located; and
    (c) a book separate from the audio signal generator including a plurality of pages having discrete printed information and at least one page containing an electrical contact capable of being detected by the audio signal generator which retrieves data from the memory corresponding to the printed information on the selected page and converts the data into an audible signal.

2. The novelty device of claim 1 wherein the novelty device comprises a bear.

3. The novelty device of claim 1 wherein the novelty device comprises a doll.

4. The novelty device of claim 1 wherein the audio signal generator is shaped generally like a pointer.

5. The novelty device of claim 4 wherein the audio signal generator is attached to an appendage of the novelty device.

6. The novelty device of claim 1 wherein the audio signal generator includes a power source.

7. The novelty device of claim 1 wherein each page includes a distinct contact.

8. The novelty device of claim 1 wherein the audio signal generator includes a voice chip.

9. The novelty device of claim 8 wherein the audio signal generator includes a speaker.

10. The novelty device of claim 9 wherein the audio signal generator includes a removable power source.

11. A novelty device assembly comprising:
    (a) a novelty character;
    (b) a pointer capable of being removably secured to the novelty character and including an audio signal generator having a memory to store data and a speaker to provide an audible signal, wherein the pointer is capable of being supported by the novelty character, the pointer having a housing in which the memory and speaker are located; and
    (c) a book separate from the pointer including a plurality of pages having discrete printed information and at least one page containing an electrical contact capable of being detected by the audio signal generator and retrieving data from the memory corresponding to the printed information on the selected page and converting the data into and audible signal.

12. The novelty device of claim 11 wherein the novelty device comprises a bear.

13. The novelty device of claim 11 wherein the novelty device comprises a doll.

14. The novelty device of claim 13 wherein the pointer includes a removable power source.

15. The novelty device of claim 14 wherein the removable power source comprises a battery.

16. A novelty device comprising:

(a) a novelty character;

(b) a pointer capable of being supported by the novelty character and including an audio signal generator having a memory to store data and a speaker to provide an audible signal, the pointer having a housing in which the memory and speaker are located; and (c) a book separate from the audio signal generator including a plurality of pages having different printed information and at least one page containing a different contact capable of being detected by the audio signal generator and retrieving data from the memory corresponding to the printed information of the selected page and converting the data into an audible signal.

17. The novelty device of claim 16 wherein the pointer includes an oscillator.

18. The novelty device of claim 17 wherein the pointer further comprises a voice chip.

19. The novelty device of claim 18 wherein the voice chip includes a lookup table.

20. The novelty device of claim 19 wherein the pointer further comprises a speaker.

21. A novelty device comprising:

(a) an audio signal generator including a memory to store data and a speaker to provide an audible signal, wherein the audio signal generator is capable of being held by a user's hand, the audio signal generator having a housing in which the memory and speaker are located and being physically separate from the display; and (b) a display having printed information and an electrical contact capable of being detected by the audio signal generator and capable of closing a circuit which retrieves data from the memory relating to the printed information and converts the data into an audible verbal signal corresponding to the printed information.

22. The novelty device of claim 21 wherein the audio signal generator includes a power source.

23. The novelty device of claim 22 wherein the audio signal generator include a voice chip.

24. The novelty device of claim 23 wherein the audio signal generator includes a removable power source.

* * * * *